(12) United States Patent
Corcoran et al.

(10) Patent No.: US 9,527,091 B2
(45) Date of Patent: Dec. 27, 2016

(54) HYDROCLONE WITH IMPROVED CLEANING ASSEMBLY

(71) Applicant: Dow Global Technologies LLC, Midland, MI (US)

(72) Inventors: Gerald Drouin Corcoran, Santa Clara, CA (US); Rashi Tiwari, Missouri City, TX (US); Chad V. Schuette, Freeland, MI (US); Peter J. Schulz, Midland, MI (US); Mark O. Labonville, Sanford, MI (US); Jim M. Grider, Jr., Colon, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/428,056

(22) PCT Filed: Dec. 3, 2014

(86) PCT No.: PCT/US2014/068253
§ 371 (c)(1),
(2) Date: Mar. 13, 2015

(87) PCT Pub. No.: WO2015/084901
PCT Pub. Date: Jun. 11, 2015

(65) Prior Publication Data
US 2016/0263589 A1      Sep. 15, 2016

Related U.S. Application Data

(60) Provisional application No. 61/952,895, filed on Mar. 14, 2014, provisional application No. 61/912,053, filed on Dec. 5, 2013.

(51) Int. Cl.
*B04C 9/00* (2006.01)
*B04C 5/04* (2006.01)
(Continued)

(52) U.S. Cl.
CPC ............. *B04C 9/00* (2013.01); *B01D 21/0012* (2013.01); *B01D 21/267* (2013.01);
(Continued)

(58) Field of Classification Search
CPC ................ B04C 9/00; B04C 5/04; B04C 5/12; B04C 2009/004; B01D 29/018; B01D 29/6476
See application file for complete search history.

(56) References Cited

U.S. PATENT DOCUMENTS

| 431,448 A | 7/1890 | Dixon |
| 1,107,485 A | 8/1914 | Bowser |

(Continued)

FOREIGN PATENT DOCUMENTS

| DE | 8913709 | 4/1990 |
| DE | 4420730 | 5/1995 |

(Continued)

OTHER PUBLICATIONS

The Chapter I International Report on Patentability for PCT/US2014/068253, dated Jun. 7, 2016.*

(Continued)

*Primary Examiner* — David A Reifsnyder
(74) *Attorney, Agent, or Firm* — Edward W. Black

(57) ABSTRACT

A hydroclone comprising: a tank (12) including a fluid inlet (14), a filtered fluid outlet (16) and an inner peripheral wall (22) enclosing at least one chamber (24); a filter assembly (26) located within the chamber (24) and comprising a circular filter screen (27) centered about an axis (X); and a cleaning assembly (48) comprising at least one cleaning member (52) biased against and adapted to rotate about the periphery (29) of the filter screen (27); and at least one of: a) the filter screen (27) is reversibly deformable a radial distance (D) of from 0.1 to 10 times the average pore size by (Continued)

the cleaning member (52) biased against the periphery (29) of the filter screen (27); and b) a compressive member (58) providing a continuous radially inward force that biases the cleaning member (52) against the periphery (29) of the filter screen (27).

8 Claims, 7 Drawing Sheets

(51) Int. Cl.
| | |
|---|---|
| B04C 5/12 | (2006.01) |
| B01D 29/01 | (2006.01) |
| B01D 29/64 | (2006.01) |
| B04C 5/081 | (2006.01) |
| B04C 5/103 | (2006.01) |
| B04C 5/14 | (2006.01) |
| B04C 5/22 | (2006.01) |
| B01D 21/00 | (2006.01) |
| B01D 21/26 | (2006.01) |
| B01D 29/70 | (2006.01) |

(52) U.S. Cl.
CPC ....... *B01D 29/018* (2013.01); *B01D 29/6476* (2013.01); *B04C 5/04* (2013.01); *B04C 5/081* (2013.01); *B04C 5/103* (2013.01); *B04C 5/12* (2013.01); *B04C 5/14* (2013.01); *B04C 5/22* (2013.01); *B01D 29/70* (2013.01); *B01D 2201/583* (2013.01); *B04C 2009/004* (2013.01)

(56) References Cited

U.S. PATENT DOCUMENTS

| | | | |
|---|---|---|---|
| 1,919,653 A | 7/1933 | Hill | |
| 2,706,045 A | 4/1955 | Large | |
| 2,788,087 A | 4/1957 | Lenehan | |
| 2,917,173 A | 12/1959 | Rakowsky | |
| 3,061,098 A | 10/1962 | Brezinski | |
| 3,219,186 A | 11/1965 | Polhemus et al. | |
| 3,285,422 A | 11/1966 | Wiley | |
| 3,529,724 A | 9/1970 | Maciula et al. | |
| 3,822,533 A | 7/1974 | Oranje | |
| 3,893,914 A | 7/1975 | Bobo | |
| 3,947,364 A | 3/1976 | Laval, Jr. | |
| 4,062,766 A | 12/1977 | Duesling | |
| 4,120,783 A | 10/1978 | Baummer | |
| 4,146,468 A | 3/1979 | Wilson | |
| 4,159,073 A | 6/1979 | Liller | |
| 4,178,258 A | 12/1979 | Papay et al. | |
| 4,216,095 A | 8/1980 | Ruff | |
| 4,298,465 A | 11/1981 | Druffel | |
| 4,414,112 A | 11/1983 | Simpson et al. | |
| 4,575,406 A | 3/1986 | Slafer | |
| 4,596,586 A | 6/1986 | Davies et al. | |
| 4,608,169 A | 8/1986 | Arvanitakis | |
| 4,651,540 A | 3/1987 | Morse | |
| 4,662,909 A | 5/1987 | Durr | |
| 4,698,156 A | 10/1987 | Bumpers | |
| 4,865,751 A | 9/1989 | Smisson | |
| 4,931,180 A | 6/1990 | Darchambeau | |
| 5,104,520 A | 4/1992 | Maronde et al. | |
| 5,116,516 A | 5/1992 | Smisson | |
| 5,188,238 A | 2/1993 | Smisson et al. | |
| 5,227,061 A | 7/1993 | Bedsole | |
| 5,277,705 A | 1/1994 | Anderson et al. | |
| 5,407,584 A | 4/1995 | Broussard, Sr. | |
| 5,466,384 A | 11/1995 | Prevost et al. | |
| 5,478,484 A | 12/1995 | Michaluk | |
| 5,593,043 A | 1/1997 | Ozmerih | |
| 5,879,545 A | 3/1999 | Antoun | |
| 5,972,215 A | 10/1999 | Kammel | |
| 6,110,242 A | 8/2000 | Young | |
| 6,117,340 A | 9/2000 | Carstens | |
| 6,210,457 B1 | 4/2001 | Siemers | |
| 6,238,579 B1 | 5/2001 | Paxton et al. | |
| 6,251,296 B1 | 6/2001 | Conrad et al. | |
| 6,511,599 B2 | 1/2003 | Jaroszczyk et al. | |
| 6,531,066 B1 | 3/2003 | Saunders et al. | |
| 6,613,231 B1 | 9/2003 | Jitariouk | |
| 6,790,346 B2 | 9/2004 | Caleffi | |
| 6,896,720 B1 | 5/2005 | Arnold et al. | |
| 7,166,230 B2 | 1/2007 | Nilsen et al. | |
| 7,316,067 B2 | 1/2008 | Blakey | |
| 7,351,269 B2 | 4/2008 | Yau | |
| 7,632,416 B2 | 12/2009 | Levitt | |
| 7,651,000 B2 | 1/2010 | Knol | |
| 7,785,479 B1 | 8/2010 | Hosford | |
| 7,896,169 B2 | 3/2011 | Levitt et al. | |
| 7,998,251 B2 | 8/2011 | Pondelick et al. | |
| 8,201,697 B2 | 6/2012 | Levitt et al. | |
| 8,663,472 B1 | 3/2014 | Mallard et al. | |
| 8,701,896 B2 | 4/2014 | Levitt et al. | |
| 8,882,999 B2 | 11/2014 | Levitt et al. | |
| 8,960,450 B2 | 2/2015 | Caffell et al. | |
| 2003/0029790 A1 | 2/2003 | Templeton | |
| 2003/0221996 A1 | 12/2003 | Svoronos et al. | |
| 2004/0211734 A1 | 10/2004 | Moya | |
| 2005/0109684 A1 | 5/2005 | DiBella et al. | |
| 2007/0075001 A1 | 4/2007 | Knol | |
| 2007/0187328 A1 | 8/2007 | Gordon | |
| 2010/0044309 A1 | 2/2010 | Lee | |
| 2010/0083832 A1 | 4/2010 | Pondelick et al. | |
| 2010/0096310 A1 | 4/2010 | Yoshida | |
| 2011/0160087 A1 | 6/2011 | Zhao et al. | |
| 2011/0220586 A1 | 9/2011 | Levitt | |
| 2012/0010063 A1 | 1/2012 | Levitt et al. | |
| 2012/0145609 A1 | 6/2012 | Caffell et al. | |

FOREIGN PATENT DOCUMENTS

| | | |
|---|---|---|
| DE | 19914674 | 12/2000 |
| DE | 10001737 | 10/2001 |
| DE | 102005027509 | 12/2006 |
| EP | 0375671 | 6/1990 |
| EP | 0475252 | 3/1992 |
| EP | 0380817 | 1/1993 |
| EP | 0566792 | 10/1993 |
| EP | 0429409 | 4/1994 |
| EP | 2082793 | 7/2009 |
| FR | 2791904 | 10/2000 |
| GB | 2007118 | 5/1979 |
| GB | 2309182 | 7/1997 |
| GB | 2423264 | 8/2006 |
| JP | 2006068690 | 3/2006 |
| KR | 2004105165 | 12/2004 |
| KR | 899416 | 5/2009 |
| WO | 0218056 | 3/2002 |
| WO | 03026832 | 4/2003 |
| WO | 2004064978 | 8/2004 |
| WO | 2014066036 | 10/2013 |
| WO | 2013173115 | 11/2013 |
| WO | 2013181028 | 12/2013 |
| WO | 2013181029 | 12/2013 |

OTHER PUBLICATIONS

DOW Water & Process Solutions, G. Onifer, Oct. 2010, Executive Summary: Clean Filtration Technologies, Inc Turboclone Filter.
Clean Filtration Technologies, Inc. CFT Turboclone Demo System, 2010.
Clean Filtration Technologies, Inc. CFT Turboclone TC-201 Technical Datasheet, 2010.

\* cited by examiner

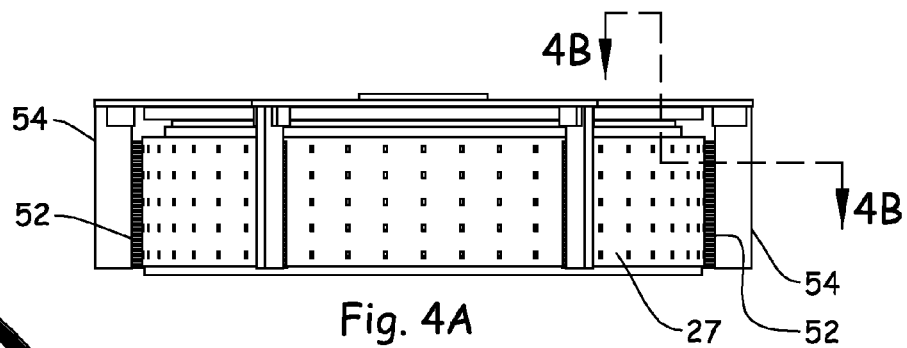
Fig. 4A
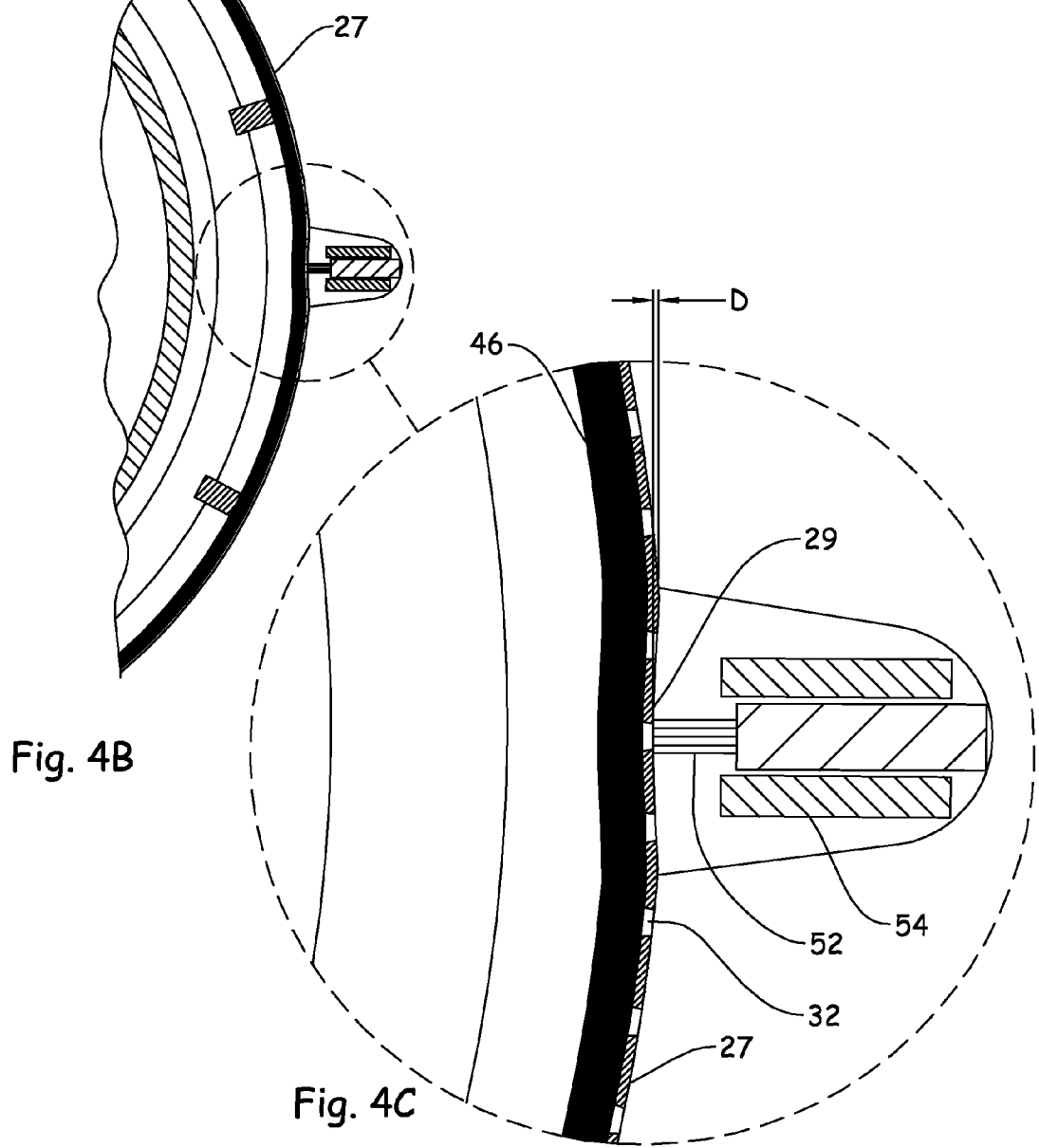
Fig. 4B
Fig. 4C

HYDROCLONE WITH IMPROVED CLEANING ASSEMBLY

FIELD

The invention is directed toward cyclonic and cross flow filtration of fluids.

INTRODUCTION

Hydroclones are commonly used to separate suspended particles from liquids. In a typical embodiment, pressurized feed liquid (e.g. waste water) is introduced into a cylindrically or conically shaped chamber under conditions that create a vortex within the chamber. Centrifugal forces associated with the vortex urge denser particles towards the periphery of the chamber. As a result, liquid located near the center of the vortex has a lower concentration of particles than that at the periphery. This "cleaner" liquid can then be withdrawn from a central region of the hydroclone. Separation efficiency can be improved by including a filter assembly within the chamber such that a portion of the liquid moving to the center of the chamber passes through a filter screen. In one known embodiment, the filter screen comprises a thin circular band of metal including slots or holes (i.e. "pores") having a diameter that prevents passage of larger-sized particles and debris. As described in US2012/0010063 and WO2012/154448, the hydroclone may further include a cleaning assembly having brushes, scrapers or squeegees that rotate about the outer circumference of the filter screen and remove debris. Additional examples are described in: U.S. Pat. No. 7,632,416, U.S. Pat. No. 7,896,169, U.S. Pat. No. 8,201,697 and US2013/0126421. While effective, further improvements in cleaning assemblies are desired, including those which provide better efficiency and require less maintenance.

SUMMARY

In a preferred embodiment, the subject hydroclone (10) includes: a tank (12) including a fluid inlet (14), a filtered fluid outlet (16) and an inner peripheral wall (22) enclosing at least one chamber (24); a filter assembly (26) located within the chamber (24) and comprising a circular filter screen (27) centered about an axis (X) wherein the filter screen (27) encloses a filtrate chamber (36) in fluid communication with the filtered fluid outlet (16); and a cleaning assembly (48) comprising at least one cleaning member (52) biased against and adapted to rotate about a periphery (29) of the filter screen (27); wherein:

a) the filter screen (27) is reversibly deformable a radial distance (D) of from 0.1 to 10 times the average pore size by the cleaning member (52) biased against the periphery (29) of the filter screen (27); and/or b) a compressive member (58) providing a continuous radially inward force that biases the cleaning member (52) against the periphery (29) of the filter screen (27).

BRIEF DESCRIPTION OF THE DRAWINGS

Various aspects of the invention may be better understood by reference to the following description taken in conjunction with the accompanying drawings wherein like numerals have been used throughout the various views to designate like parts. The depictions are illustrative and are not intended to be to scale or otherwise limit the invention.

FIG. 4A is an elevational view of an embodiment of a filter assembly (26) and cleaning (48) assembly.

FIG. 4B is an enlarged cross-sectional view taken along lines 4B-4B of FIG. 4A.

FIG. 4C is an enlarged view of FIG. 4B showing the filter screen (27) radially deformed in response to a cleaning member (52) biased against its periphery (29).

DETAILED DESCRIPTION

The present invention generally relates to hydroclone filtration devices and related methods of conducting cyclonic separation. For purposes of the present description, the term "hydroclone" refers to a filtration device that at least partially relies upon centrifugal forces generated by vortex fluid flow to separate constituents of a fluid mixture. Examples include the separation of solid particles from a liquid mixture and separation of mixtures including liquids of differing densities (e.g. oil and water). Specific applications include the treatment of: pulp effluent generating by paper mills, process water generated by oil and gas recovery, bilge water and municipal and industrial waste water.

Figure 1A:
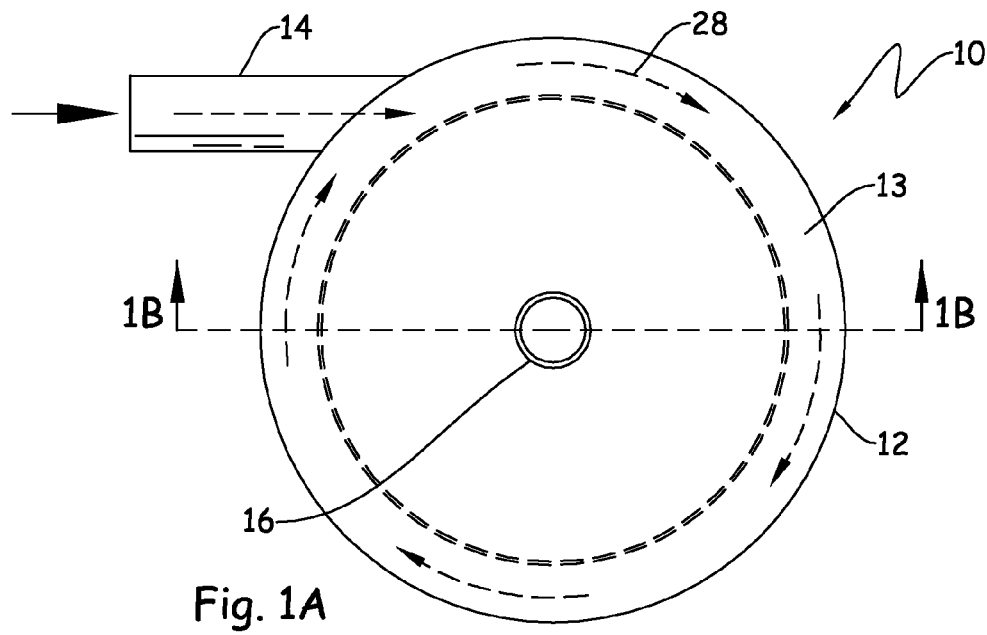
FIG. 1A an elevational view showing one embodiment of the invention.
Figure 1B:
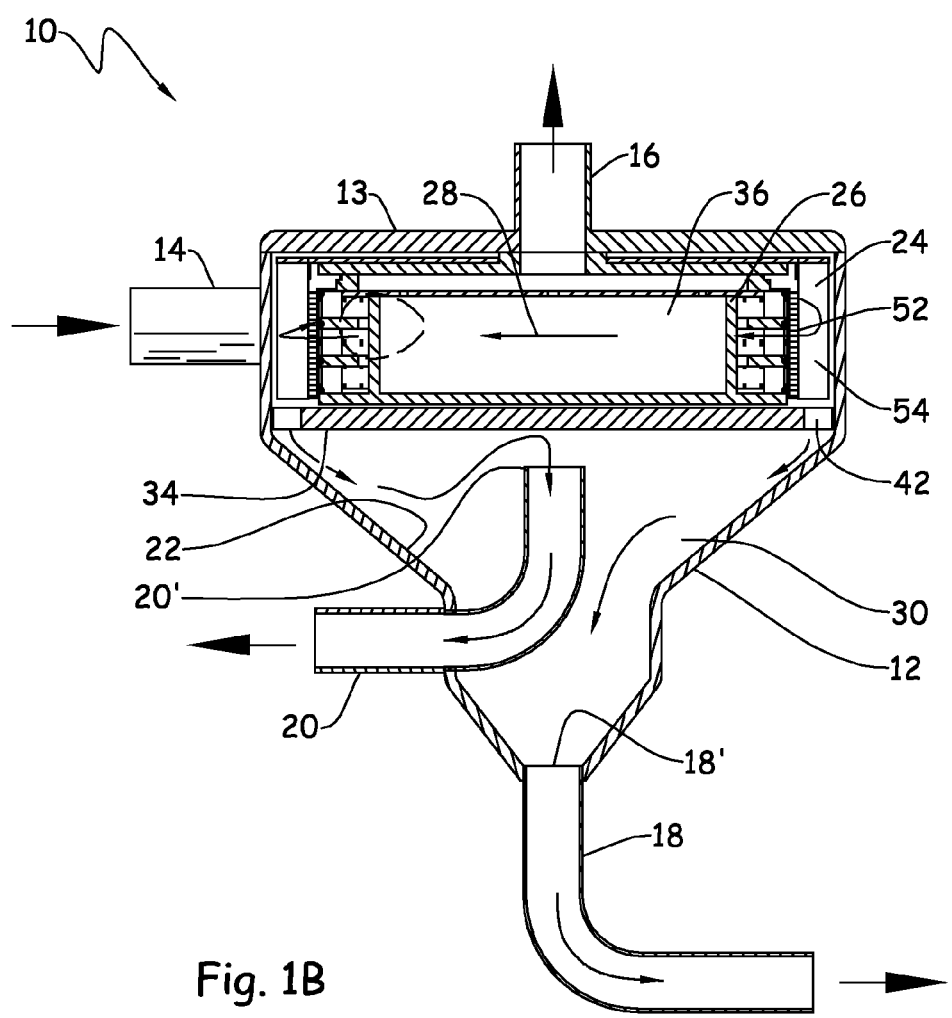
FIG. 1B is a cross-sectional view taken along lines 1B-1B of FIG. 1A.
Figure 2:
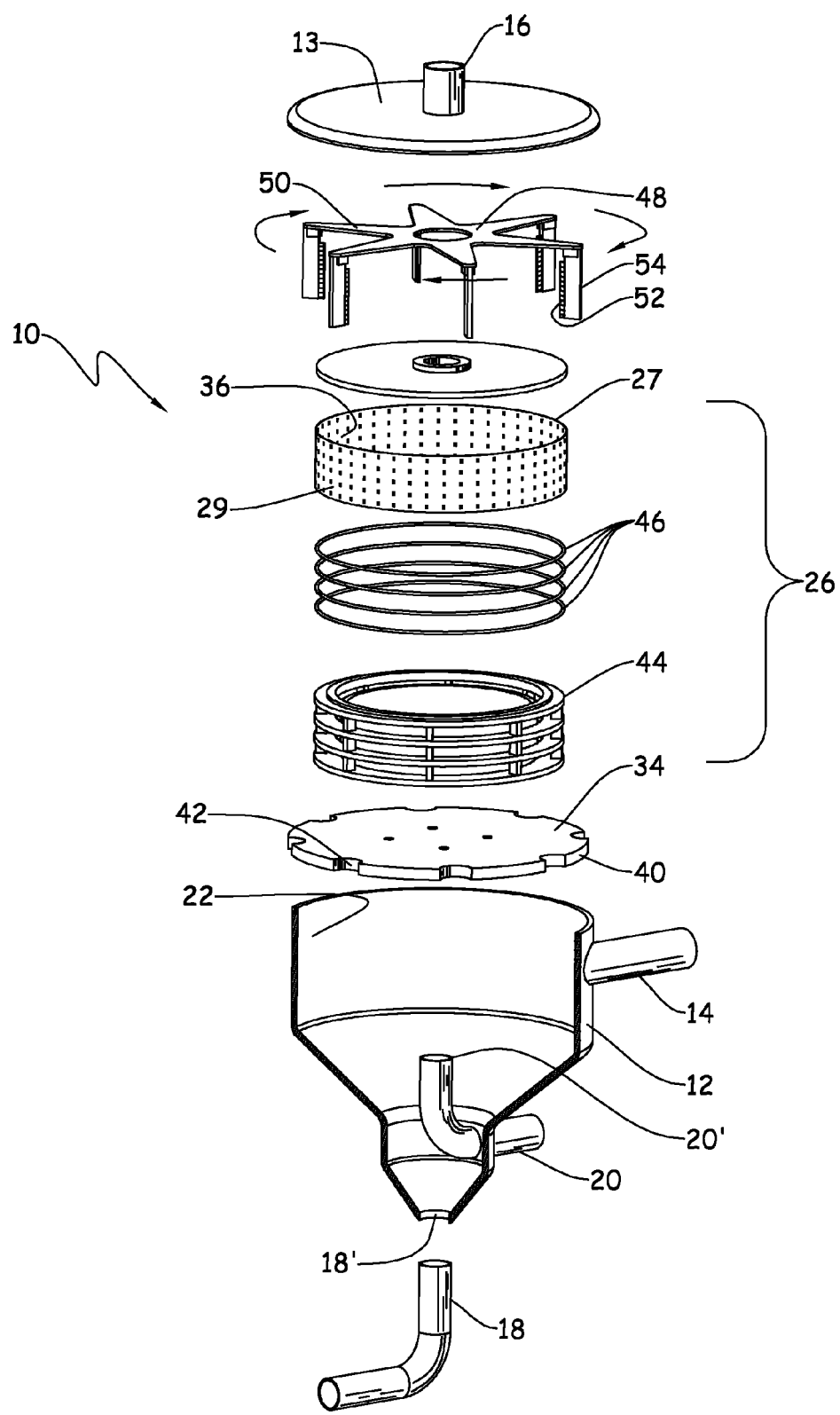
FIG. 2 is an exploded, partially cut-away perspective view of the embodiment shown in FIGS. 1 A and B.

One embodiment of the invention is illustrated in FIGS. 1-2 including a hydroclone generally shown at 10 including a tank (12) having a removable lid (13), a fluid inlet (14), a filtered fluid outlet (16), an effluent outlet (18), an optional process fluid outlet (20) and an inner peripheral wall (22) enclosing at least one, but preferably plurality of vertically aligned chambers (24, 30). While depicted as including two vertically aligned chambers (24, 30), additional chambers may also be included. Similarly, additional fluid inlets and outlets may also be included. While shown as having a cylindrical upper section and a frustro-conical base centered about a central axis, the tank (12) may have other configurations including an entirely cylindrical shape.

A filter assembly (26) is located within the chamber (24) (i.e. "vortex chamber") and comprises a circular filter screen (27) centered about an axis (X) and defining a periphery (29) concentrically located about the axis (X) and including a plurality of pores (32) passing therethrough which have an average pore size of 1 to 250 µm. The filter screen (27) encloses a filtrate chamber (36) which is in fluid communication with the filtered fluid outlet (16). An optional effluent separation chamber (30) may be located below and in fluid communication with the vortex chamber (24). The effluent separation chamber (30) is adapted for receiving unfiltered fluid from the vortex chamber (24). An optional vortex flow barrier (34) may be located between the vortex and effluent separation chambers (24, 30) and may be adapted to direct fluid flow between the vortex and effluent separation (24, 30) chambers to locations adjacent to the inner peripheral wall (22) of the tank (12). The vortex flow barrier (34) may be designed to maintain vortex fluid flow in the effluent separation chamber (24) and disrupt vortex fluid flow (28) as fluid flows from the vortex chamber (24) into the effluent separation chamber (30). More specifically, the vortex flow barrier (34) includes an outer periphery (40) extending to locations adjacent to or in contact with the inner peripheral wall (22) of the tank (12) and may further include a plurality of apertures (42) located near the periphery (40) and extending therethrough. In the illustrated embodiment, the apertures (42) are scalloped-shaped but alternative shapes may also be used. An effluent opening or pathway (e.g. pipe) (18') is centrally located in the lower portion of the tank (12) and is in fluid communication with the effluent outlet (18) by which effluent may exit the tank (12). While not shown, the opening (18') or outlet (18) may optionally include a valve (e.g. one-way check valve) for selectively permitting effluent to flow from the tank (12).

In operation, pressurized feed fluid (e.g. preferably from 4 to 120 psi) enters the tank (12) via the fluid inlet (14) and follows along fluid pathway (28) and generates a vortex about the filter assembly (26). Centrifugal forces urge denser materials toward the inner peripheral wall (22) of the tank (12) while less dense liquid flows radially inward toward the filter screen (27). A portion of this liquid flows through the pores (32) of the filter screen (27) into the filtrate chamber (36) and may exit the tank (12) as "filtrate" by way of the filtered fluid outlet (16). The remaining "non-filtrate" flows downward from the vortex chamber (24) to the effluent separation chamber (30). The vortex flow barrier (34) directs the majority (e.g. preferably at least 75% and in some embodiments at least 90%) of such downward flow to locations along or adjacent to an inner peripheral wall (22) of the tank (12). This arrangement is believed to help maintain vortex flow within the vortex chamber (24) while disrupting the vortex flow as fluid enters the effluent separation chamber (30). Fluid flow slows in the effluent separation chamber (30) and denser materials (e.g. particles) preferentially settle toward the bottom of the tank (12) and then may enter the effluent opening (18') and may then exit the tank by way of effluent outlet (18). The remaining liquid (hereinafter referred to as "process fluid") in the effluent separation chamber (30) flows upward into a centrally located process fluid opening or pathway (e.g. pipe) (20') in fluid communication with the process fluid outlet (20). In most applications, process fluid represents a mid-grade product that may be re-used, disposed of or recycled back to the fluid inlet (14) for further treatment. "Filtrate" typically represents a high grade product that may be re-used or disposed of. "Effluent" represents a low grade product that may be further treated or disposed of. However, it should be appreciated that in some applications, effluent may represent a valuable product.

The feed fluid inlet pressure and spacing between the periphery (29) of the filter assembly (26) and the inner peripheral wall (22) of the tank (12) may be optimized to create and maintain a vortex fluid flow within the vortex chamber (24). See for example US2013/0126421. In order to further facilitate the creation and maintenance of vortex fluid flow, the fluid inlet (14) preferably directs incoming feed fluid on a tangential path about the vortex chamber (24), as indicated by dotted arrows in FIG. 1A.

As shown in FIGS. 1-2, the filter assembly (26) is preferably centrally located within the vortex chamber (24) and evenly spaced from the inner peripheral wall (22) of the tank (12). While shown as being cylindrical, other configurations may be used including conical shaped filters.

Figure 3:
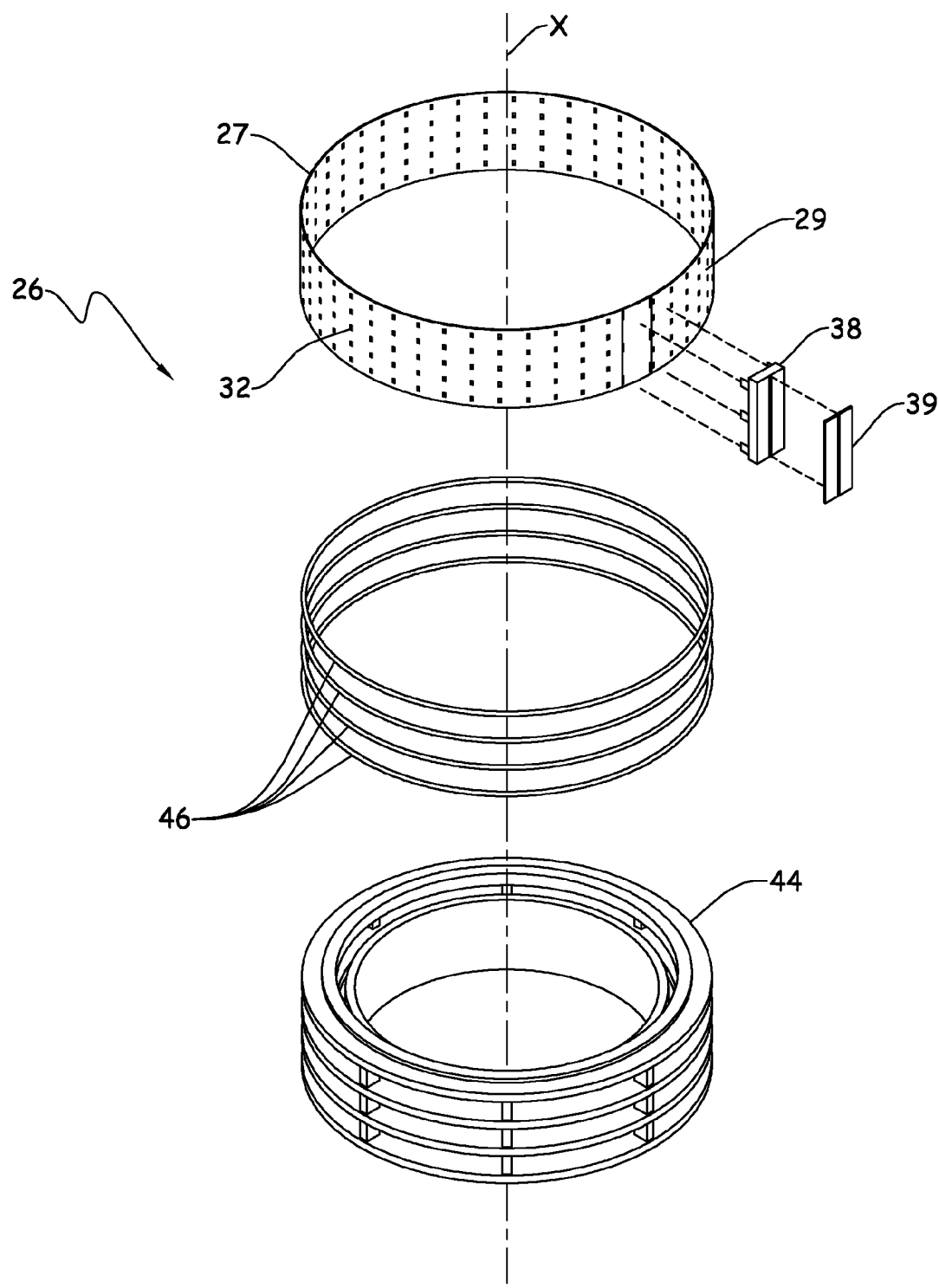
FIG. 3 is an exploded view of an embodiment of a filter assembly (26).

As shown in FIG. 3, the filter assembly (26) includes a circular filter screen (27) centered about an axis (X) including a concentrically located outer periphery (29) having a plurality of pores (32) passing through the screen. The shape of the pores (32) is not particularly limited, (e.g. V-shape, cylindrical, slotted, mesh, etc.) and may vary depending upon the composition of the feed liquid. The filter screen (27) may be fabricated from a wide variety of materials include polymers, ceramics and metals. In a preferred embodiment, the filter screen (27) is relatively thin, e.g. from 0.1-0.4 mm. In a preferred embodiment, the filter screen (27) comprises a corrosion-resistant metal (e.g. electroformed nickel screen) including uniform sized pores (32) having an average size from 1 to 250 µm, more preferably 5 to 200 µm, as measured by SEM. Representative examples of such materials are described: U.S. Pat. No. 7,632,416, U.S. Pat. No. 7,896,169, US2011/0120959, US 2011/0220586 and US2012/0010063, the entire subject matter of which is incorporated herein by reference. While the filter screen (27) may be cast, molded or otherwise fabricated as a continuous circular component, in a preferred embodiment the screen is fabricated from a band of material that is flexed into a circle and secured at its ends to form a circular configuration. The means for securing the ends of the band are not particularly limited and include welding, riveting or use of an adhesive. In the preferred embodiment shown in FIG. 3, the ends of the screen are fixed by way of a crimped stable assembly (38) including an outer wear plate (39) that protects the union from excessive wear from a rotating cleaning member (52) described below.

The filter screen (27) is optionally supported by an underlying support frame (44). The support frame (44) maintains the screen (27) in a generally circular configuration during operation. In one preferred embodiment, an optional flexible member (46) is located between the filter screen (27) and the support frame (44). In the illustrated embodiment, the flexible member (46) comprises a plurality of elastomeric O-rings (46), (e.g. 3/32 OD Viton A hollow tube). While shown as separate components, the support frame (44) and flexible member (46) may be integrated into a single component. As will be described in more detail below, the flexible member (46) permits the filter screen (27) to reversibly deform a predetermined radial distance, preferably from 0.1 to 10 times (more preferably 0.25 to 2 times) the average pore size. This degree of deformation alters the shape and/or size of the pores (32) and stores energy in both the flexible member (46) and the filter screen (27) while preventing excessive crazing or cracking of the filter screen. While dependent upon the application, the flexible member (46) preferably has a Shore hardness durometer A value of from 20 to 100 as measured by ASTM D2240-05 (2010) but will collapse with 1-8 psi of pressure, thus the choice of a hollow tube is preferred.

As shown in FIGS. 2 and 4A-C, the hydroclone (10) further includes a cleaning assembly (48) for removing debris from the periphery (29) of the filter screen (27). The cleaning assembly (48) may be mounted on the top surface of the filter assembly (26) and includes one or more spokes (50) extending radially outward. A cleaning member (52), (e.g. nylon or brass brush) extends downward from the end of the spoke (50) and engages the periphery (29) of the filter screen (27). While shown as a brush (52), alternative cleaning members may be used, e.g. wipers, blades, rollers, squeegees, scrapers, etc. From 2 to 60 cleaning members, and more preferably from 6 to 24 cleaning members are used. As represented by curved arrows in FIG. 2, the cleaning assembly (48) rotates about filter assembly (26) such that the brushes (52) sweep the periphery (29) of the screen (27) and remove debris. One or more paddles (54) may be mounted to the end of at least one spoke (50) such that fluid flowing into the vortex chamber (24) rotates the cleaning assembly (48) about the filter assembly (26). Spacing paddles (54) evenly about the filter assembly (26) adds stability to the rotating movement of the cleaning assembly (48) and may help maintain vortex fluid flow in the vortex chamber (24). The paddles (54) and/or cleaning members (52) may lay normal to the periphery (29) of the filter screen (27), or may be slanted, (e.g. from −5° to −30° or 5° to 30° from the radial axis). Bearings may be used between the filter and cleaning assemblies (26, 48) to further facilitate rotation without impeding vortex fluid flow. In alternative embodiments not shown, the cleaning assembly (48) may be driven by alternative means, e.g. electronic motor, magnetic force, etc.

Figure 5A:
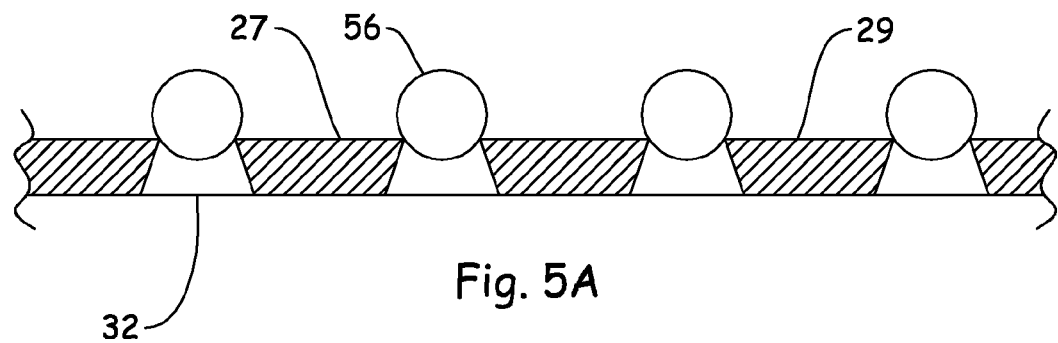
FIG. 5A is an enlarged simplified elevation view of the filter screen (27) showing an idealized particle (56) lodged within a pore (32).
Figure 5B:
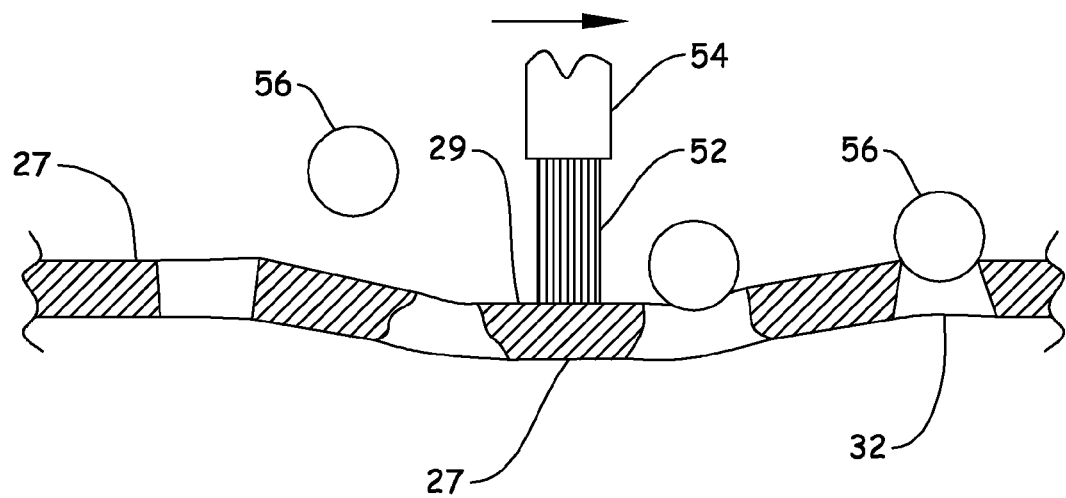
FIG. 5B is the embodiment of FIG. 5A showing the filter screen (27) radially deforming in response to a cleaning member (52) biased against and moving across the screen (27) and dislodging a particle (56) from a pore (32).

While not shown to scale, FIGS. 4B-C illustrate the cleaning member (52) being fixed and radially biased inward against the periphery (29) of the filter screen (27) such that the screen (27) reversibly deforms inward a radial distance (D) of from 0.1 to 10 times the average pore size. In operation, the cleaning member (52) travels about the circumference of the screen (27) with its leading edge deforming the screen (27). The extent of deformation may be controlled by the flexible member (46) positioned on the opposite side of screen (27). As previously mentioned, the distance (D) of screen deformation is important for modifying the size or configuration of the pores (32) while preventing premature cracking or crazing of the screen (27). As illustrated in the idealized views provided in FIGS. 5A-B, the change in size or configuration of the pores (32) facilitates the removal of particles (56) entrapped within the pores (32) of the filter screen (27). The mechanical action of the cleaning member (52) along with turbulent fluid flow provides additional sweeping action to aid in particle (56) removal. In a preferred embodiment, the cleaning member (52) rotates about the periphery (29) at a rate at least 60 RPM.

Figure 6A:
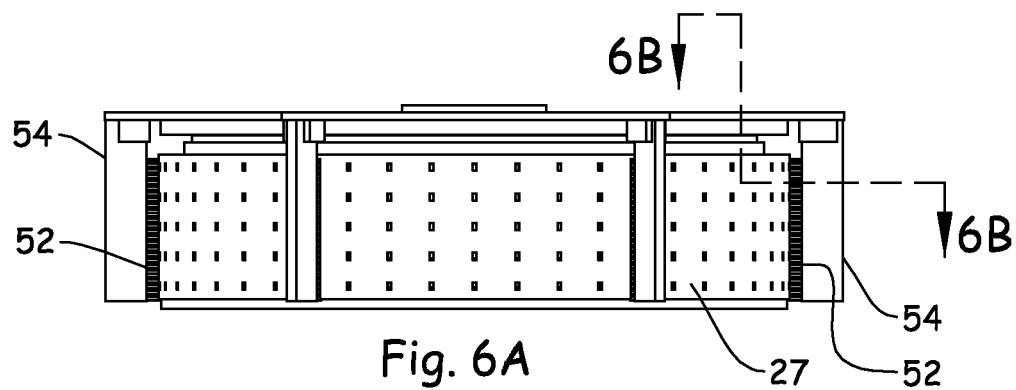
FIG. 6A is an elevational view of another embodiment of a filter assembly (26) and cleaning assembly (48).
Figure 6B:
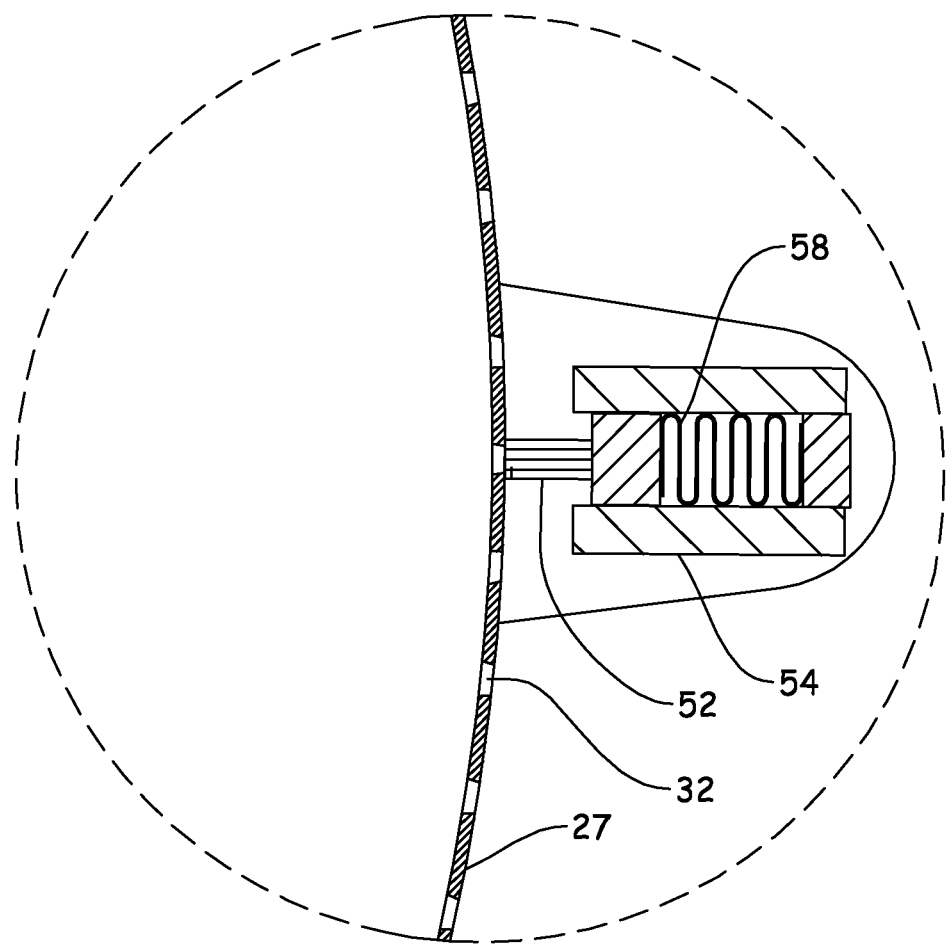
FIG. 6B is an enlarged cross-sectional view taken along lines 6B-6B of FIG. 6A showing a compressive member (spring-loading assembly) (58).
Figure 7:
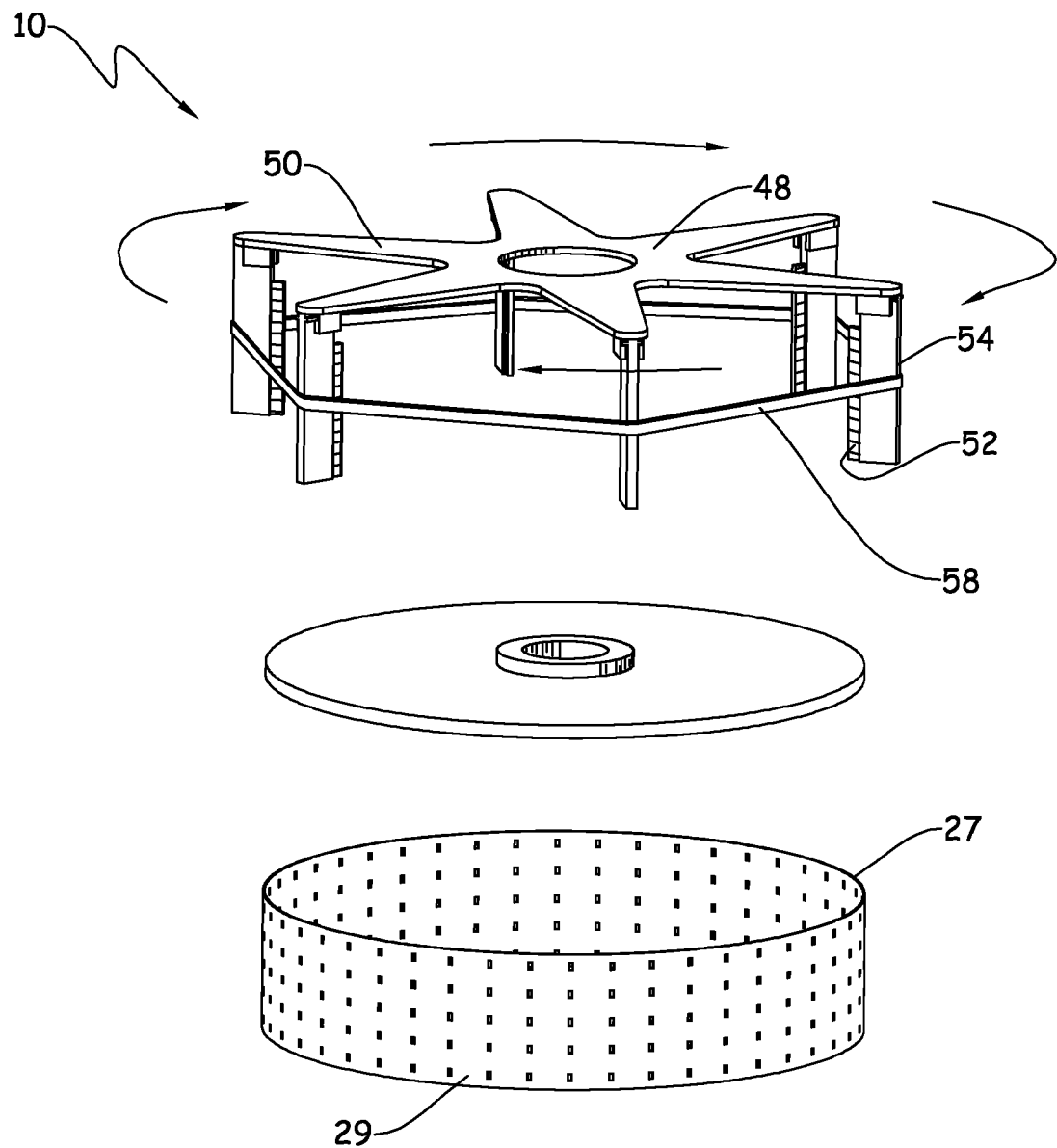
FIG. 7 is an exploded perspective view of another embodiment of the cleaning assembly (48) including a compressive member (elastomeric band) (58).

In an alternative embodiment illustrated in FIGS. 6A-6B and 7, the cleaning member(s) (52) is not fixed but is movable in a radial direction to engage the periphery (29) of the filter screen (27). The cleaning assembly (48) further includes and a compressive member (58) engaged with the cleaning member (52). The compressive member (58) provides a radially inward force against the cleaning member (52). The compressive member (58) is not particularly limited and includes spring-loaded devices including various types of springs, e.g. coil, cantilever, volute, torsional, gas (cylinder with compressed gas), and the like. In an alternative embodiment shown in FIG. 7, the compressive member (58) comprises an elastomeric band that is stretched and positioned about the periphery of the cleaning assembly (48) in tension to provide a radially inward compressive force against the cleaning member(s) (52) and to bias the members (52) against the periphery (29) of the filter screen (27). In a preferred embodiment, the compressive member (58) provides a continuous (e.g. +/−10%) radially inward force against the cleaning member (52) even as the engaging portions of the cleaning member (52) and filter screen (27) begin to wear. In this way, the cleaning member(s) (52) maintains a desired pre-determined biasing force against the periphery (29) of the filter screen (27) and provides a longer period of optimal operation. The compressive force of the compressive member (58) is may be selected to optimize performance based upon pore size, size and nature of the debris, filter type and type of cleaning member (e.g. brass fibers, nylon fibers, etc.). Preferred compressive forces range from 0.05 to 1 Newtons.

In a further preferred embodiment, the cleaning assembly (48) includes a plurality of cleaning members (52) evenly spaced about and compressably-loaded against the periphery (29) of the filter screen (27). In a still more preferred embodiment, each of the cleaning members (52) exerts a substantially equivalent radial inward force (e.g. +/−5%) against the periphery (29) of the filter screen (27). Such an embodiment stabilizes (e.g. reduces vibrations) the filter assembly (26) as turbulent fluid passes through the hydroclone and the cleaning members (52) move across the filter screen (27). This stability reduces wear and operational inefficiencies and is particularly beneficial when operating at high feed rates wherein the cleaning members (52) rotate about the filter screen in excess of 60 RPMs, 100 RPMs, and even 1000 RPMs.

In another preferred embodiment, the hydroclone includes the features illustrated in both FIGS. 4 and 6. That is, the filter screen (27) is reversibly deformable by the cleaning member (52), the cleaning member (52) is movable in a radial direction, and the compressive member (58) is engaged with the cleaning member (52) and provides a radially inward force against the cleaning member (52). The compressive force of the compressive member (58) is preferably selected to coincide with the force necessary to reversible deform the filter screen (27) a radial distance (D) of from 0.1 to 10 times the average pore size. As the cleaning member (52) wears, the compressive member (58) moves the cleaning member (52) radially inward to apply a compressive force necessary to maintain the desired deformation of the filter screen (27).

Many embodiments of the invention have been described and in some instances certain embodiments, selections, ranges, constituents, or other features have been characterized as being "preferred." Such designations of "preferred" features should in no way be interpreted as an essential or critical aspect of the invention. While shown in a vertical orientation (i.e. X-axis being vertical), the assembly (10) may assume alternative orientations, e.g. horizontal. While shown as a single operating unit, multiple assemblies may be coupled in parallel and serial arrangements with filtrate or effluent being used as feed for downstream assemblies.

The invention claimed is:
1. A hydroclone (10) comprising:
  a tank (12) including a fluid inlet (14), a filtered fluid outlet (16), an effluent outlet (18) and an inner peripheral wall (22) enclosing at least one chamber (24);
  a filter assembly (26) located within the chamber (24) and comprising a circular filter screen (27) centered about an axis (X) and defining a concentric periphery (29) including a plurality of pores (32) having an average pore size passing therethrough, wherein the filter screen (27) encloses a filtrate chamber (36) in fluid communication with the filtered fluid outlet (16) such that fluid passing through the pores (32) enters the filtrate chamber (36) and may exit the tank (12) by way of the filtered fluid outlet (16); and a cleaning assembly (48) comprising a cleaning member (52) biased against and adapted to rotate about the periphery (29) of the filter screen (27); and wherein:

the filter screen (27) is reversibly deformed a radial distance (D) of from 0.1 to 10 times the average pore size by the cleaning member (52) biased against the periphery (29) of the filter screen (27).

2. The hydroclone of claim 1 wherein the filter assembly (26) further comprises a support frame (44) adopted to maintain the filter screen (27) in a generally circular configuration during operation and a flexible member (46) located between the filter screen (27) and the support frame (44) that permits the filter screen (27) to reversibly deform a predetermined radial distance (D) of from 0.1 to 10 times the average pore size.

3. The hydroclone of claim 1 further comprising:

a fluid pathway (28) adapted for receiving incoming fluid and generating a vortex fluid flow about the filter assembly (26);

two vertically aligned chambers including a vortex chamber (24) in fluid communication with the fluid inlet (14) and an effluent separation chamber (30) adapted for receiving unfiltered fluid from the vortex chamber (24);

a process fluid outlet (20) in fluid communication with the effluent separation chamber (30) by which process fluid may exit the tank (12); and an effluent outlet (18) in fluid communication with the effluent separation chamber (30) by which effluent may exit the tank (12).

4. The hydroclone of claim 1 wherein the cleaning member (52) is movable in a radial direction, and wherein the cleaning assembly (48) comprises a compressive member (58) that provides a continuous radially inward force that biases the cleaning member (52) against the periphery (29) of the filter screen (27).

5. The hydroclone of claim 4 wherein the compressive member (58) comprises a spring-loaded device.

6. The hydroclone of claim 5 wherein the cleaning assembly (26) includes a plurality of cleaning members (52) evenly spaced about the periphery (29) of the filter screen (27).

7. The hydroclone of claim 4 wherein the compressive member (58) comprises an elastomeric band.

8. The hydroclone of claim 7 wherein the cleaning members (52) each exert a substantially equivalent radial inward force against the periphery (29) of the filter screen (27).

* * * * *